United States Patent

[11] 3,622,464

| [72] | Inventors | Edward O. Stapley<br>Metuchen;<br>Marion Jackson, Cranford, both of N.J. |
|---|---|---|
| [21] | Appl. No. | 791,172 |
| [22] | Filed | Jan. 14, 1969 |
| [45] | Patented | Nov. 23, 1971 |
| [73] | Assignee | Merck & Co., Inc.<br>Rahway, N.J. |

[54] PREPARATION OF (−) (CIS-1,2 EPOXYPROPYL) PHOSPHONIC ACID
4 Claims, No Drawings

[52] U.S. Cl. ............................................. 195/80, 195/114
[51] Int. Cl. ............................................. C12d 9/00
[50] Field of Search ............................................. 195/80, 114

[56] References Cited
UNITED STATES PATENTS

| 3,386,889 | 6/1968 | Moses et al. | 195/80 X |

FOREIGN PATENTS

| 1,046,047 | 12/1958 | Germany | 424/203 |

OTHER REFERENCES

Churi et al., J. of Am. Chem Soc. 83, 1966, pp. 1824– 5.
Chemical Abstracts, 62 (1965), 10457(f).
Derwent Farmdoc No. 35893, Abstracting BE 718,507, Publ. 1–24–69.
Levine et al., " A Competation of Culture Media," 1930, The Williams & Wilkins Co., Baltimore, pp. 19(No. 53), 32(No. 98), 74(No. 243), 106(No. 371), 110(No. 383), 175(No. 617) (Copy in Group 172).

*Primary Examiner*—Joseph M. Golian
*Attorneys*—J. Jerome Behan and John Frederick Gerkens ABSTRACT: Increased yields of the antibiotic (−) (cis-1,2-epoxypropyl)-phosphonic acid are obtained by the addition of a source of citrate to fermentation media composed of complex organic and/or chemically defined nutrients. The antibiotic which is produced by growing newly found strains of Streptomyces on suitable fermentation media is active against both gram-positive and gram-negative bacteria.

3,622,464

PREPARATION OF (−) (CIS-1,2 EPOXYPROPYL) PHOSPHONIC ACID

DESCRIPTION OF THE PREFERRED EMBODIMENTS

The invention relates to the production of a new and useful antibiotic known chemically as (−) (cis-1,2-epoxypropyl)-phosphonic acid and, in particular, to an improved method for the production of the antibiotic by fermentation of nutrient media with suitable strains of micro-organisms such as, for example, Streptomyces.

The antibiotic is produced during the aerobic fermentation of suitable aqueous nutrient media under controlled conditions. Aqueous media such as those employed for the production of other antibiotics are suitable for producing (−)(cis-1,2-epoxypropyl)-phosphonic acid. Such media contain sources of carbon and nitrogen which are assimilable by the micro-organism, and inorganic salts. In addition, the fermentation media contain traces of metals necessary for the growth of the micro-organism which are commonly supplied as impurities incidental to the other constituents of the medium. In general, carbohydrates such as sugars, for example dextran, maltose, galactose, glucose and the like, and starches such as grains, for example oats and rye, cornstarch, cornmeal and the like, can be used either alone or in combination as sources of assimilable carbon in the nutrient medium. The exact amount of the carbohydrate source or sources utilized in the medium will depend in part upon the other ingredients of the medium. It has been found, however, that an amount of carbohydrate between about 1 and 6 percent by weight of the medium is sufficient. A single carbon source may be used, or several carbon sources may be combined in the medium.

Satisfactory nitrogen sources include myriad proteinaceous materials such as various forms of hydrolysates of casein, soybean meal, corn steep liquor, distillers solubles, yeast hydrolysates, tomato paste, and the like. The various sources of nitrogen can be used either alone or in combination, and are used in amounts ranging from 0.2–6 percent by weight of the aqueous medium.

(−) (Cis-1,2-epoxypropyl)-phosphonic acid is formed by growing, under controlled conditions, strains of micro-organisms such as, for example, those strains of the genus Streptomyces which produce the antibiotic. One such micro-organism, which was isolated from soil, has been designated MA-2898 in the culture collection of Merck & Co., Inc., Rahway, New Jersey; subisolates from the parent culture have been designated MA-2912, and MA-2913. These cultures have been placed on permanent deposit with the culture collection of the Northern Utilization Research & Development Branch of the United States Department of Agriculture at Peoria, Ill. and have been assigned the culture numbers NRRL B–3357, NRRL B–3358, NRRL B–3359, and NRRL B–3360, respectively. These micro-organisms have been classified in the species Streptomyces fradiae.

The antibiotic is also produced by growing, under controlled conditions, other strains of Streptomyces also isolated from soil and identified in the Merck & Co., Inc. culture collection as cultures MA–2867, MA–2903, MA–2916, MA–2917 and MA–3270. These cultures have been classified as members of the species Streptomyces viridochromogenes. Cultures MA–2903, MA–2867, MA–2916, MA–2917, and MA–3270 have been placed on permanent deposit with the culture collection of the Northern Utilization Research and Development Division of the United States Department of Agriculture and have been assigned the culture numbers NRRL–3413, NRRL–3414, NRRL–3415, NRRL–3416, and NRRL–3427, respectively.

Culture MA–3269 has been assigned to the species Streptomyces wedmorensis and has been assigned an NRRL number of 3426.

In addition to the above species of micro-organisms, also contemplated is the use of other micro-organisms, including strains of Streptomyces either isolated from nature or obtained by mutation of these organisms, such as those obtained by natural selection or those produced by mutating agents, such as, for example, X-ray irradiation, ultraviolet irradiation, nitrogen mustards, and the like.

Due to the inherent difficulty in separating pure (−)(cis-1,2-epoxypropyl)-phosphonic acid from the large quantities of impurities in the fermentation broth, it is of great importance to find a way to increase the concentration of the antibiotic relative to the total broth solids.

It has been discovered that the addition of citrate to complex organic and chemically defined fermentation media will enhance the production of (−) (cis-1,2-epoxypropyl)-phosphonic acid. By "complex organic media" is meant media wherein some of the ingredients are not chemically defined. An example of such media is one consisting of ground oats, soybean meal, sodium ascorbate, and distillers solubles. By "chemically defined media" is meant media in which all of the ingredients are chemically defined. An example of such media is one consisting of cornstarch, potassium acid phosphate, sodium ascorbate, asparagine, methionine, monosodium glutamate, calcium chloride, magnesium sulfate and ferrous sulfate. The amount of citrate needed to stimulate production of the antibiotic varies depending upon the medium employed. The actual concentration of citrate employed in a given formulation medium will vary, depending upon the particular micro-organism used and the fermentation conditions employed. Improved production of the antibiotic has been observed in media containing about 4–8 grams per liter of the citrate source when added as sodium citrate. In general it has been found that the addition of from about 0.50 grams/liter to about 8.0 grams/liter of the citrate source will increase the production of the antibiotic. The addition of sodium citrate to a medium composed of complex organic nutrients, for example, will increase the production of (−)(cis-1,2-epoxypropyl)-phosphonic acid by as much as 95 percent when the sodium citrate is present in concentrations ranging om about 1.0 grams/liter to about 8.0 grams/liter. Correspondingly, in a chemically defined or synthetic medium the addition of a citrate source has been shown to increase the production of (−)(cis-1,2-epoxypropyl)-phosphonic acid six- to sevenfold, for example, when the concentration of sodium 0citrate is increased from 1 to about 4 grams/liter of medium. Thus, a concentration of citrate equivalent to from about 0.65 to about 5.2 grams/liter of medium will increase the production of the antibiotic.

Any citrate source which will provide an adequate citrate concentration in the fermentation medium may be employed. The citrate is added preferably in the form of an inorganic salt, such as sodium, potassium, or calcium citrate, although the free acid may also be employed. The citrate may also be added in the form of a naturally occurring citrate salt of a complex, such as may be present in microbial nutrients which are rich in citric acid. The usual nutrients include a source of assimilable carbon, a source of assimilable nitrogen, inorganic salts, and growth factors when required. The addition of citrate to fermentation media containing other micro-organisms which are capable of producing -epoxypropyl)-phosphonic ) (cis-1,2-epoxypropyl)-phosphonic acid is also contemplated. A source of citrate may also be used in conjunction with other stimulants for the production of (−) (cis-1,2-epoxypropyl)-phosphonic acid, such as cobalt, monosodium glutamate, a source of phosphorous, methionine, and L-cysteine. The additional production stimulants may be present in the fermentation medium as a nutrient, or they may be present as additives. The use of citrate in conjunction with other stimulants for the production of the antibiotic results in an added increase in the production of the antibiotic.

Although the new antibiotic of this invention is produced by both surface and submerged cultures, it is presently preferred to carry out the fermentation in the submerged state. Small-scale fermentations are conveniently carried out by placing suitable quantities of nutrient medium in flasks, sterilizing the flasks and contents by heating to 120° C., inoculating the flasks with either spores or a vegetative cellular growth of a (−)(cis-1,2-epoxypropyl)-phosphonic acid producing micro-organism, for example, a strain of *Streptomyces*, loosely stoppering the necks of the flasks with cotton, and permitting the fermentation to proceed in a constant temperature room at about 28° C. for 3–5 days. For larger scale work it is preferable to conduct the fermentation in suitable tanks provided with an agitator and a means of aerating the fermentation medium. In this method, the nutrient medium is made up in the tank and sterilized by heating at 120° C. After cooling, the sterilized medium is inoculated with a suitable source of vegetative cellular growth of the micro-organism and the fermentation is rmitted to proceed for 2–4 days while agitating and/or aerating the nutrient medium and maintaining the temperature at about 28° C. This method of producing (−)(cis-1,2-epoxypropyl)-phosphonic acid is particularly suited for the preparation of large quantities of the new antibiotic.

The fermentation using the (−)(cis-1,2-epoxypropyl)-phosphonic acid producing micro-organism can be 0carried out at temperatures ranging from about 20°–40° C. For optimum results, however, it is more convenient to conduct the fermentations at temperatures between 26° and 30° C. The pH of the nutrient media suitable for growing the micro-organism and producing the antibiotic may vary from about 5.0 to 9.0. The preferred pH range, however, is from about 6.0 to 7.5.

In carrying out the fermentation process, a cell suspension is prepared by the addition of sterile medium to an agar slant culture of a (−)(cis-1,2-epoxypropyl)-phosphonic acid producing micro-organism. Growth from the slant culture is then used to inoculate a seed flask and the seed flask is shaken at about 28° C. for 1–3 days in order to obtain good growth. The seed flask is then used to inoculate the production flasks. Alternatively, the seed flask can be inoculated from a lyophilized culture or a frozen inoculum.

The inoculation is generally carried out using about 1 ml. per 30 ml. of production medium containing the desired concentration of citrate, and the fermentation is rmitted to proceed for 2–4 days while agitating and/or aerating the nutrient medium and maintaining the temperature at about 28° C. All of the production flasks, i.e., those containing added citrate and the flasks used as controls, are then assayed, generally after 3–4 days, to determine the amount of antibiotic produced in each flask.

(−)(Cis-1,2-epoxypropyl)-phosphonic acid is conveniently assayed by a disc plate procedure using *Proteus vulgaris* MB–838 (ATCC 21100 and NRRL B–3361) as the test organism. The test culture is maintained as a slant culture on nutrient agar (Difco) plus 0.2 percent yeast extract (Difco). The inoculated slants are incubated at 37° C. for 18–24 hours and stored at refrigerator temperatures until used; fresh slants are prepared each week.

The inoculum for the assay plates is prepared each day by inoculating a 250 ml. Erlenmeyer flask containing 50 ml. of nutrient broth (Difco) plus 0.2 percent yeast extract (Difco) with a scraping from the slant. The flask is incubated on a shaking machine at 37° C. for 18–24 hours. The broth culture is then adjusted to 40 percent transmittance at a wavelength of 660 m$\mu$, using a Bausch & Lomb Spectronic 20 by the addition of 0.2 percent yeast extract solution to the growth.

Uninoculated broth is used as a blank for this determination. Thirty ml. of the adjusted broth is used to inoculate 1 liter of medium.

Nutrient agar (Difco) plus 0.2 percent yeast extract (Difco) is used as the assay medium. This medium is prepared, sterilized by autoclaving, and allowed to cool to 50° C. After the medium is inoculated, 10 ml. is added to sterile petri dishes and the medium is allowed to solidify.

The activity is expressed in terms of units, a unit being defined as the concentration of the antibiotic per ml. which on a ½-inch paper disc will produce a zone diameter of 28 mm. Four concentrations of the antibiotic are employed for the preparation of the standard curve, namely, 0.3, 0.4, 0.6, and 0.8 units per millimeter; each concentration being obtained by the dilution in 0.05M tris-(hydroxymethyl)-aminomethane buffer adjusted to pH 8.0. Four discs are placed on each of the five plates for the preparation of the standard curve, each plate containing one disc of each of the four concentrations of antibiotic shown above. The plates are incubated for 18 hours at 37° C., and the diameters of the zones of inhibition in millimeters are measured. An average zone diameter for each concentration is calculated, from which a standard curve is prepared on semilog graph paper. The slope of the line obtained is between 4 and 5.

The production flasks are then assayed by diluting the sample in 0.05 molar buffer at pH 8 to an appropriate concentration. The test organism is *Proteus vulgaris* MB–838, and the assay medium is nutrient agar plus 0.2 percent yeast extract. Where either the disc plate or cylinder plate assay is employed, from 10 to 15 ml. of the medium is poured per plate. Where the disc plate procedure is employed, the discs are dipped into 0.4 units per milliliter of the antibiotic solution and are placed on the plate in a position alternate to the sample. The plates are then incubated at 37° C. for 18 hours, and the zone diameters in millimeters are determined. Where the cylinder plate procedure is employed, six cylinders, three of the sample and three of the control solution, are used per plate, alternating the sample and control solution. The control solution contains 1 $\gamma$/ml. of the free acid. Five standard plates containing six levels 0of the standard ranging from 0.25 $\gamma$/ml. to 3.0 $\gamma$/ml. are employed. The assay is calculated by means of a Nomograph, and the results are reported in terms of units or gamma per milliliter. One unit of the free acid is equal to 2.8$\gamma$.

The antibiotic can be purified and recovered in purer form by a number of procedures. One such procedure comprises adsorbing the antibiotic on alumina; either basic or acid-washed alumina is suitable for this purification. The adsorbed antibiotic can be eluted from the alumina most conveniently by aqueous or aqueous-alcoholic ammonium hydroxide solutions having a pH of about 11.2 and fractionally collecting the eluate. Purification of impure solid fractions containing the ammonium salt of (−)(cis-1,2-epoxypropyl)-phosphonic acid can also be effected by dissolving such material in methanol, adding an equal volume of n-butanol, evaporating off the methanol, filtering off any butanol-insoluble material, and recovering a butanol solution containing the ammonium salt of the antibiotic of enhanced purity. The ammonium salt can then be obtained in solid form by evaporating the butanol solution to dryness under reduced pressure. Alternatively, the ammonium salt can be extracted from the butanol solution with water to obtain an aqueous solution of the ammonium salt of (−)(cis-1,2-epoxypropyl)-phosphonic acid. The calcium salt of the antibiotic is produced by adding calcium hydroxide to the aqueous solution of the ammonium salt and warming the resulting solution under reduced pressure. Alternatively, the calcium salt is also obtained by passing a solution of another salt of the antibiotic over a cation exchange resin on the calcium cycle. The calcium salt crystallizes from aqueous solutions having a concentration of 10 mg./ml. upon standing or with agitation. These purification procedures are described in more detail in the pending application of Louis Chaiet, Ser. No. 699,377, filed Jan. 22, 1968.

The free acid is a white crystalline solid which decomposes at 170° C.

(−)(Cis-1,2-epoxypropyl)-phosphonic acid and its salts are useful antimicrobial agents, which are active in inhibiting the growth of both gram-positive and gram-negative pathogenic bacteria. This antibiotic and particularly its salts, are active against *Bacillus*, *Escherichia*, *Staphylococci*, *Salmonella*, and *Proteus* pathogens, and antibiotic-resistant strains thereof. Illustrative of such pathogens are *Escherichia coli*, *Salmonella schottmuelleri*, *Salmonella gallinarum*, *Proteus vulgaris*, *Proteus mirabilis*, *Proteus morganii*, and *Staphylococcus aureus*. Thus, (−) (cis-1,2-epoxypropyl)-phosphonic acid and salts thereof can be used as antiseptic agents to remove susceptible organisms from pharmaceutical, dental, and medical equipment and other areas subject to infection by such organisms. Similarly, they can be used to separate certain micro-organisms from mixtures of micro-organisms. Salts of (−)(cis-1,2-epoxypropyl),phosphonic acid are also useful in the treatment of diseases caused by bacterial infections in man and animals and are particularly valuable in this respect, since they are active against resistant strains of pathogens. These salts are especially valuable, since they are effective when given orally, although they can also be administered parenterally.

The following examples are given for purposes of illustration and not by way of limitation:

EXAMPLE 1

To an agar slant culture of *Streptomyces fradiae* NRRL B–3360 was added 10 ml. of sterile skimmed milk. The skimmed milk suspension was lyophilized in individual sterile tubes containing 0.1–0.2 ml. of the suspension, and the freeze-dried culture was used to inoculate a 250 ml. baffled Erlenmeyer flask containing 40 ml. of a seed medium of the following composition:

A.

| Seed Medium | Amount |
| --- | --- |
| Ground oatmeal | 10 g. |
| Yeast hydrolysate | 10 g. |
| $MgSO_4 \cdot 7H_2O$ | 50 mg. |
| Phosphate buffer* | 2 ml. |
| Distilled $H_2O$ | 1,000 ml. | pH=6.6

*Phosphate buffer: $KH_2PO_4$=91 grams
$Na_2HPO_4$=95 grams
Distilled $H_2O$=1,000 ml.

The seed flask was incubated at 28° C. for 1 day on a 220 r.p.m. rotary shaker with a 2 inch throw.

Eight 250 ml. Erlenmeyer flasks were prepared each containing 50 ml. of medium of the following composition:

B.

| Complex Production Medium | Amount |
| --- | --- |
| Ground oats | 30.0 g. |
| Soybean meal | 25.0 g. |
| Distillers solubles | 10.0 g. |
| Sodium ascorbate | 0.5 g. |
| Distilled $H_2O$ | 1,000 ml. | pH=6.5

An aqueous solution of sodium citrate was then added to the flasks to give a final concentration of sodium citrate as listed in the table below. These flasks were then sterilized, cooled and inoculated by adding 1.0 ml. of the seed medium prepared as described above. The inoculated flasks were incubated at 28° C. on a rotary shaker operating at 220 r.p.m. with a 2 in. throw. One flask was removed after 3 days; another flask was removed after 4 days' incubation. The contents of each flask were centrifuged at 8,500 r.p.m. for 10 minutes, and the broth was decanted from the solids. The supernatant broths were assayed using *Proteus vulgaris* MB–838 as the test organism. The assays of the broth obtained after incubation for 3 and 4 days is shown below:

C.

| Medium | g./l. Sodium Citrate·$2H_2O$ | units/ml. Antibiotic 3 day | 4 day |
| --- | --- | --- | --- |
| Complex production base | 0 | 2.3 | 2.4 |
| Complex production base | 1.0 | 2.6 | 2.2 |
| Complex production base | 2.0 | 2.7 | 2.4 |
| Complex production base | 4.0 | 3.7 | 2.9 |
| Overall Increase | | 58% | 21% |

EXAMPLE 2

The production of (−)(cis-1,2-epoxypropyl)-phosphonic acid was carried out as outlined in example 1. The following assay results were obtained:

A.

| Medium | g./l. Sodium Citrate·$2H_2O$ | units/ml. Antibiotic 3 day | 4 day |
| --- | --- | --- | --- |
| Complex production base | 0 | 2.1 | 2.5 |
| Complex production base | 1.0 | 2.7 | 2.3 |
| Complex production base | 2.0 | 3.0 | 2.9 |
| Complex production base | 4.0 | 3.6 | 3.6 |
| Complex production base | 8.0 | 4.1 | 4.1 |
| Overall Increase | | 95% | 64% |

EXAMPLE 3

A loopful of cells from an agar slant culture of *Streptomyces fradiae* NRRL B–3360 of the following composition:

A.

| Slant Medium | Amount |
| --- | --- |
| Corn starch | 10.0 g. |
| Asparagine | 1.0 g. |
| $K_2HPO_4$ | 1.0 g. |
| $H_2O$ | 1,000 ml. | pH=7.0 was used to inoculate a 250 ml. baffled Erlenmeyer flask containing 40 ml. of seed medium of the following composition:

B.

| Seed Medium | Amount |
| --- | --- |
| Corn starch | 10.0 g. |
| Asparagine | 1.0 g. |
| $K_2HPO_4$ | 1.0 g. |
| $H_2O$ | 1,000 ml. | pH=7.0

The inoculated flask was incubated at 28° C. for 2 days on a 220 r.p.m. rotary shaker with a 2 inch throw.

Six 250 ml. Erlenmeyer flasks were prepared, each containing 30 ml. of medium of the following composition:

C.

| Chemically Defined Production Medium | Amount |
| --- | --- |
| Corn starch | 20 g. |
| $K_2HPO_4$ | 0.5 g. |
| Sodium ascorbate | 0.5 g. |
| Sodium citrate | 1.0 g. |
| $FeSO_4 \cdot H_2O$ | 0.03 g. |
| Trace element mix no. 2* | 10 ml. |
| NaCl | 0.3 g. |
| $MgSO_4 \cdot H_2O$ | 0.2 g. |
| $CaCl_2 \cdot H_2O$ | 0.5 g. |
| Bacto-asparagine | 5.0 g. |
| D-L methionine | 1.0 g. |
| Monosodium glutamate | 1.0 g. |
| Vitamin mix concentrate** | 5.0 ml. |
| Distilled $H_2O$ | 1,000 ml. | pH=6.8–7.0

*

Formula, Trace Element Mix No. 2:

| | |
|---|---|
| $FeSO_4 \cdot 7H_2O$ | 1.0 g. |
| $MnSO_4 \cdot H_2O$ | 1.0 g. |
| $CuCl_2 H_2O$ | 25 mg. |
| $CaCl_2$ | 100 mg. |
| $H_3BO_3$ | 56 mg. |
| $(NH_4)_6MO_7O_{24} \cdot 4H_2O$ | 19 mg. |
| $ZnSO_4 \cdot H_2O$ | 200 mg. |
| Distilled $H_2O$ | 1,000 ml. |

Formula, Vitamin Mix Concentrate**

| Vitamin | Weight |
|---|---|
| Calcium pantothenate | 200 mg. |
| $B_2$ (Riboflavin) | 200 mg. |
| $B_6$ (Pyridoxine) | 200 mg. |
| $B_6$ (Pyridoxal) | 200 mg. |
| Niacin | 200 mg. |
| p-Aminobenzonic acid | 20 mg. |
| Biotin | 1.5 mg. |
| $B_{12}$ | 0.4 mg. |
| $B_1$ (thiamine) | 200 mg. |
| Distilled $H_2O$ | 1,000 ml. |

An aqueous solution of sodium citrate was then added to the flasks to give a final concentration of sodium citrate as listed in the table below. These flasks were sterilized, cooled and inoculated by adding 1.0 ml. of the seed medium prepared as described above. The inoculated flasks were incubated at 28° C. on a rotary shaker operating at 220 r.p.m. with a 2-inch throw, and one flask was removed after 4 days' incubation. The contents of each flask were centrifuged at 8,500 r.p.m. for 10 minutes, and the broth was decanted from the solids. The supernatant broths were assayed using Proteus vulgaris MB–838 as the test organism. The assays with the broth obtained after incubation for 3 and 4 days are shown below:

D.

| | g./l. Sodium | units/ml.0 Antibiotic | |
|---|---|---|---|
| Chemically defined production base | 1.0 | 0.59 | 0.56 |
| Chemically defined production base | 2.0 | 2.46 | 2.99 |
| Chemically defined production base | 4.0 | 3.97 | 4.11 |

One unit equals 2.8 µg./ml. of the free acid.

The addition of sodium citrate gave a 6–7 fold potency increase when the concentration was increased from 1 to 4 g./l.

What is claimed is:

1. In a process for the preparation of (−)(cis-1,2-epoxypropyl)-phosphonic acid which comprises growing a (−)(cis-1,2-epoxypropyl)-phosphonic acid producing Streptomyces from the group consisting of S. fradiae, S. wedmorensis, and S. viridochromogenes in an aqueous nutrient medium under aerobic conditions until substantial antibiotic activity is imparted to said medium, the improvement which comprises growing said Streptomyces in a nutrient medium containing added citrate in an amount equivalent to about 0.65 to 5.2 grams of citrate per liter of medium to produce enhanced yields of said antibiotic.

2. The process according to claim 1 wherein the Streptomyces is a strain of Streptomyces fradiae.

3. The process according to claim 1 wherein the Streptomyces is a strain of Streptomyces wedmorensis.

4. The process according to claim 1 wherein the Streptomyces is a strain of Streptomyces viridochromogenes.

* * * * *